May 6, 1969   W. F. PERDUE ETAL   3,441,999
METHOD OF AND APPARATUS FOR MAKING TAPERED
SPRING LEAF BLANKS AND THE LIKE
Filed Sept. 12, 1966
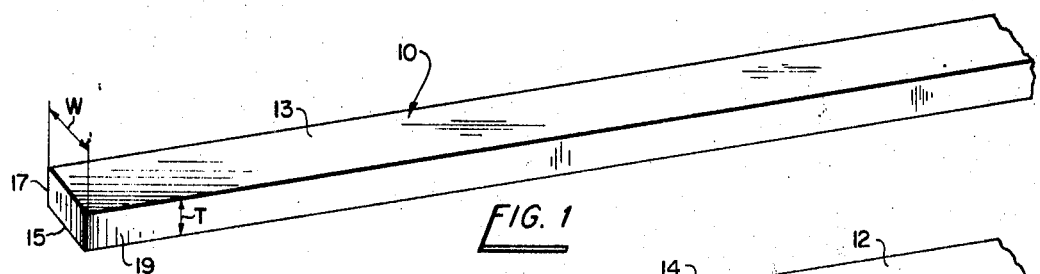
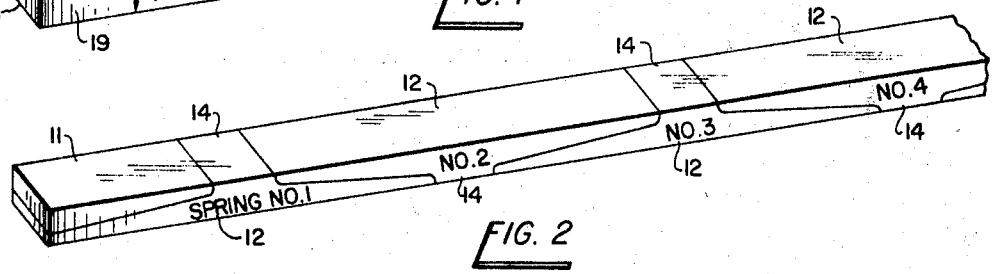
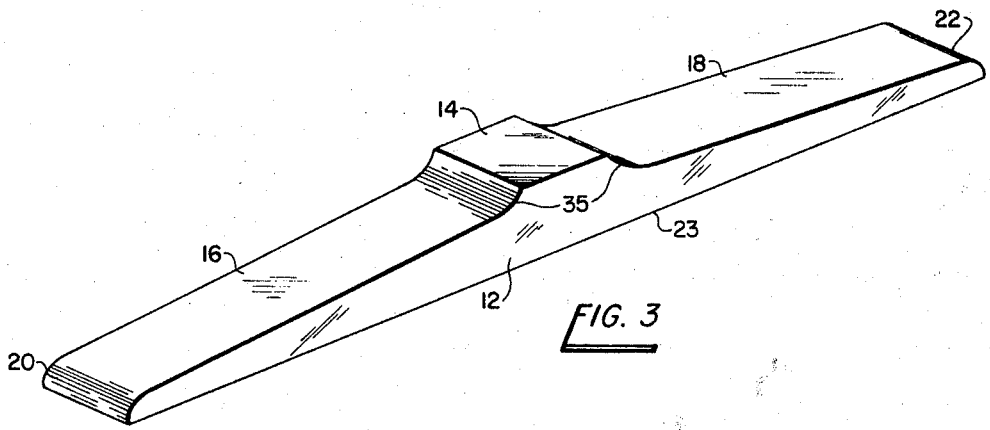
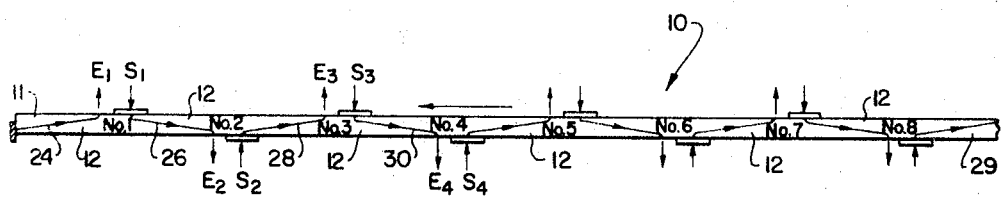
INVENTOR
WILLARD F. PERDUE
HOWARD O. COLLINS
BY
*Strauch, Nolan, Neale, Nies & Bronaugh*
ATTORNEYS

INVENTOR
WILLARD F. PERDUE
HOWARD O. COLLINS

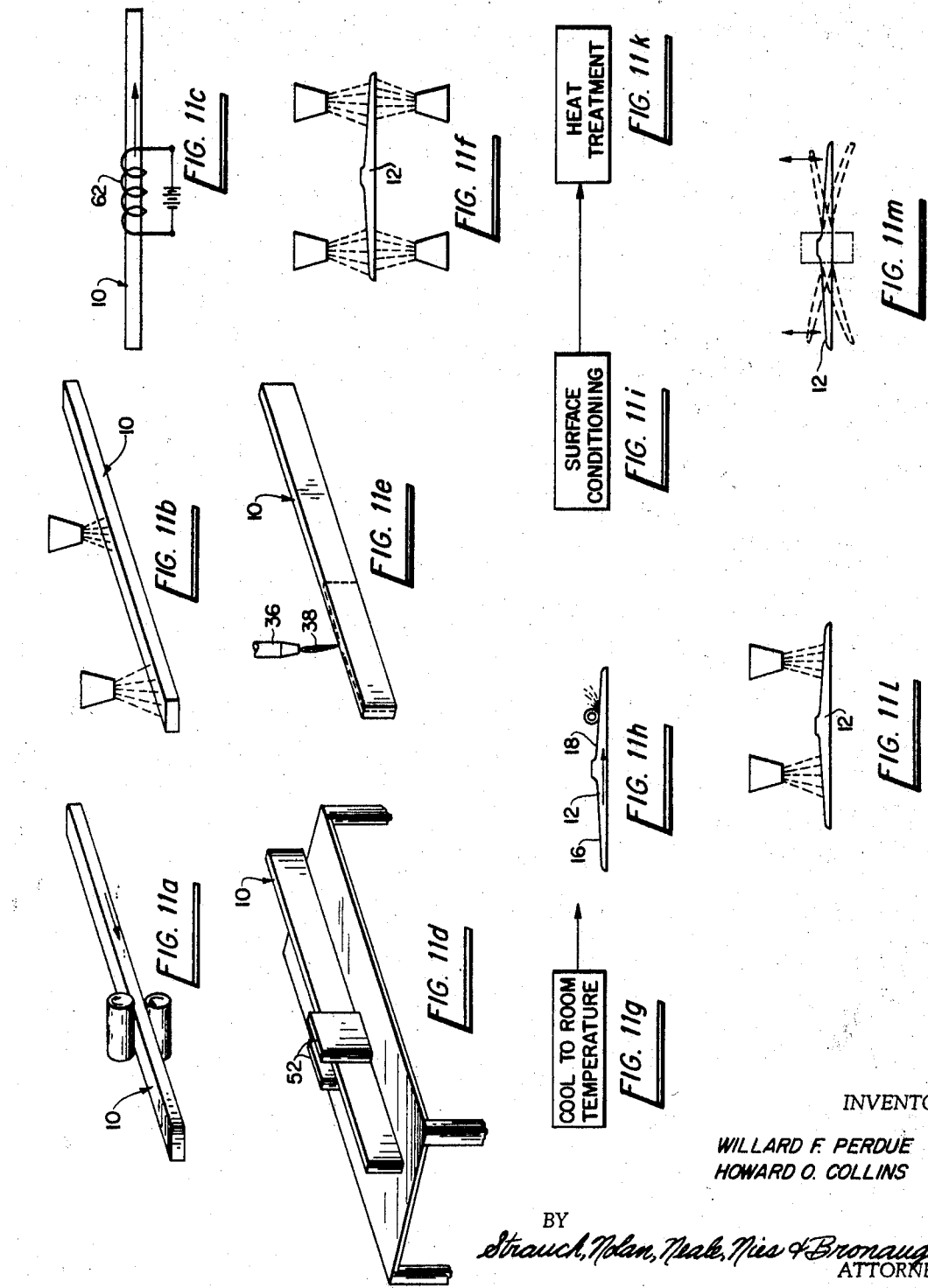

United States Patent Office 3,441,999
Patented May 6, 1969

3,441,999
METHOD OF AND APPARATUS FOR MAKING TAPERED SPRING LEAF BLANKS AND THE LIKE
Willard F. Perdue and Howard O. Collins, New Castle, Pa., assignors to North American Rockwell Corporation, Pittsburgh, Pa., a corporation of Delaware
Filed Sept. 12, 1966, Ser. No. 578,607
Int. Cl. B21f 35/00; B23p 13/00, 17/00
U.S. Cl. 29—173                                14 Claims

ABSTRACT OF THE DISCLOSURE

A method of making spring leaf blanks directly from a constant width bar of spring steel stock of rectangular cross section wherein successive longitudinal cuts of the same length are made in inclined planes extending entirely across the bar from one side to the other, alternate cuts being oppositely inclined at the same angle and entering and exiting from said blank in parallel transverse lines disposed at the constant width side surface of said blank. The bar has a constant thickness that corresponds to the thickness of the center section of the final spring leaf, and the succeeding entry and exit cut lines across each side surface of the bar are spaced a distance equal to the desired longitudinal dimension of each spring leaf center section. Preferred apparatus for carrying out the method comprises means for holding said bar stationary with its leading end in a cutting station wherein two successive oppositely inclined cuts are made by a pattern guided flame and then shifting said bar endwise to dispose a succeeding leading end section within said cutting station.

---

This invention relates primarily to the making of tapered spring leaves for vehicle suspensions and more particularly to the method of and apparatus for rapidly economically producing blanks for such tapered spring leaves and the like from bar stock. Certain aspects of the invention are equally applicable to the production of tapered bars for other uses such as lift fork tines as will appear.

Tapered spring leaves have recently been introduced in which the taper extends from both ends toward the thicker midportion of the leaf which is adapted to be rigidly clamped in a spring seat. Long tapered spring leaves of this type are currently advantageously used as single leaf spring suspensions in passenger cars and trailers and, in assemblies of two to four leaves, in heavier duty vehicles such as trucks and tractors. Extra large, long, single tapered spring leaves are now also being used as suspensions in extreme heavy duty applications such as in heavy haulage vehicles, road construction equipment and the like to replace the conventional more expensive and heavier multileaf springs that usually consisted of at least twelve or more leaves clamped together to form a unit. These tapered spring leaves have mainly been made by methods which include roll tapering in a complex machine such as that disclosed in United States Letters Patent No. 3,145,591.

It is extremely difficult and costly to produce heavy duty tapered spring leaves in such taper rolling apparatus due to the size and weight of the spring leaves and the amount of metal which has to be rolled down to obtain the desired taper configuration.

This invention has for its main object the provision of heavy duty tapered spring leaves produced by novel method and in novel apparatus directly from bar stock more economically and in larger quantities than hitherto possible, and which eliminates the use of expensive taper rolling machinery and methods.

The tapered spring leaves produced in accord with the method of the invention are of the same quality and endurance as prior rolled taper spring leaves, after undergoing treatment following taper cutting according to the taper leaf spring manufacturing method disclosed in United States Letters Patent No. 3,238,072 and/or copending applications Ser. No. 449,486 and Ser. No. 449,585 both filed Apr. 20, 1965, since matured into Patents No. 3,339,908 dated Sept. 5, 1967 and No. 3,345,727 dated Oct. 10, 1967 respectively, but the method of the invention produces larger numbers of spring leaves at lower cost.

It is a further object of the invention to provide a novel method of and apparatus for making long tapered spring leaves or the like wherein the leaves are cut from a prepared bar of metal by a flame cutting process. Pursuant to this method and apparatus the cutting torch is preferably guided as by a pattern along a path to successively cut oppositely tapered leaf spring blanks from the metal bar to reduce waste metal. Following cutting, the blanks are shot blasted on all four sides to remove scale, ground to remove surface impurities, and then heat treated and shot peened at least on the side which is to be the tension side when in use as a vehicle leaf spring, similarly to roll tapered blanks.

A further object of the invention resides in the provision of a suitably heated bar of metal of appropriate width and thickness, placing the bar on edge and flame cutting from the bar tapered blanks of predetermined shape and size by pattern guiding a cutting torch along a substantially zig-zag path lengthwise of the bar.

Still another object of the present invention is the provision of a tapered spring leaf directly cut from bar stock by a flame cutting method and procedure that affords a minimum amount of waste by substantially utilizing the entire material of the bar stock with only relatively minor portions of scrap at either end of the bar and no scrap between the adjoining blanks cut from the bar stock.

A still further object of the invention is to provide a novel method of flame cutting tapered spring leaves from bar stock by guiding a cutting torch in a predetermined path by means of a pattern follower which guides the torch along the bar in a path wherein a series of oppositely inclined diagonal cuts intersect opposed surfaces of the bar and each next succeeding cut is started at a point displaced along the bar a predetermined distance from the exit point of the preceding diagonal cut to provide for each spring blank thus made a thick central area of maximum thickness.

Other novel features will become apparent or will be specifically pointed out in the following detailed description in connection with the appended claims and the annexed drawings in which:

FIGURE 1 is a generally perspective view showing a length of metal bar stock from which the spring leaves are to be cut;

FIGURE 2 is a generally perspective view of the bar stock of FIGURE 1, with cut lines shown diagrammatically for indicating the shape, size and desired number of leaves of a particular shape to be cut from the bar stock;

FIGURE 3 is a generally perspective enlarged view illustrating a leaf spring blank as cut from the bar stock of FIGURES 1 and 2;

FIGURE 4 is an edge elevation of the bar illustrating schematically the flame cutting operation as performed on the bar stock of FIGURE 1, outlining the patterned path of travel of the cutting flame to obtain spring leaf blanks of the shape shown in FIGURE 3 with a minimum of scrap left from the bar stock;

FIGURES 11a to 11m illustrate diagrammatically successive steps whereby the method of the invention may be incorporated to produce spring leaves.

Figure 5:
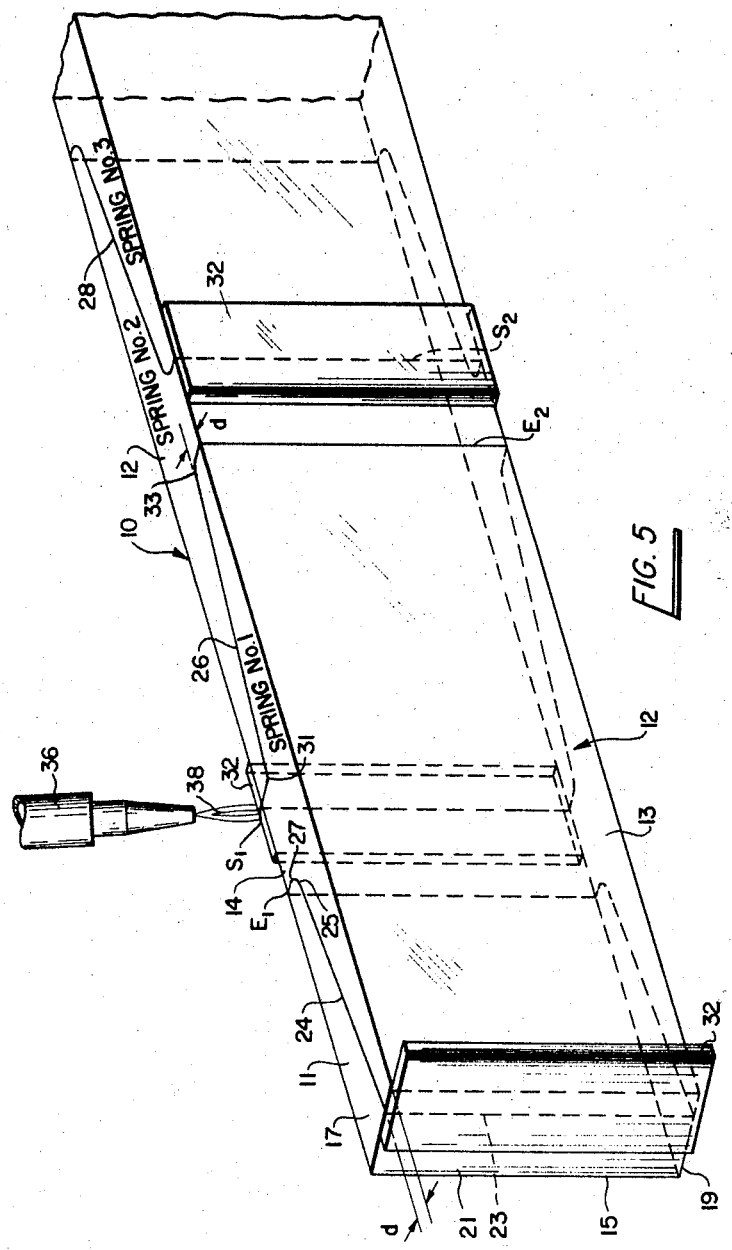
FIGURE 5 is an enlarged generally perspective view providing a more detailed illustration of the cutting path and method starting at the leading end of the bar stock.

FIGURE 1 shows a length of rectangular cross-section bar stock 10 from which the tapered spring leaf blanks 12 of FIGURES 2 and 3 are to be cut. The indicated width W corresponds to the desired constant width of the finished spring leaf, and the indicated thickness T corresponds to the maximum desired thickness of the finished spring leaf at the central spring seat area. Bar 10 has parallel upper and lower sides 13 and 15 respectively, and the other two sides 17 and 19 are also parallel. The material of the bar stock is a selected spring steel, which preferably has been vacuum degassed to hold to a minimum non-metallic inclusions in the steel. These inclusions otherwise might produce stress raisers and gouges when burned out by the cutting torch which would have a detrimental affect on the stress load characteristic of the finished leaf spring.

FIGURE 2 illustrates the pattern in which spring leaf blanks 12 are preferably cut from a suitable length of bar stock having the foregoing desired width W and thickness T. The individual blanks are formed essentially by similarly oppositely inclined planar diagonal cuts through the bar that extend longitudinally of the bar and produce substantially identical blanks each in reverse relation to that immediately preceding it in the bar stock. As shown in FIGURE 3, each blank 12 so cut out has the full constant width of the bar stock, with one flat side 23 corresponding a section of the side of the original bar and with tapered end sections 16 and 18 sloping upwardly toward a thick central region 14 having the original bar thickness.

By accurately selecting a bar stock length, a desired number of blanks may be cut therefrom with only two end pieces lost as scrap, which provides maximum utilization of expensive material. The bar of stock should be as long as can be handled in a practical manner, and it has been found convenient to select bar stock about twenty-five to thirty-five feet long, which produces five to seven heavy duty spring blanks.

The leaf spring blank 12 shown in FIGURE 3 has oppositely inclined flat surfaces 16 and 18 which intersect sides 17 and 19 at right angles and extend to provide a blank of gradually decreasing thickness from a central portion 14 of maximum thickness towards the ends 20 and 22. The flat straight surface 23 of the non-tapered side of the blank and the surface of central portion 14 between the tapered ends are original surfaces of the bar stock from which the blank was cut, and the tapered surfaces 16 and 18 and ends 20 and 22 are produced by pattern guided flame cutting of the bar stock as will be described.

The thickness of central portion 14 is determined by choice of bar stock size according to spring design requirements. The advantage of the maximum thickness portion 14 is that such increases metal thickness in the region that is rigidly clamped to the spring seat thereby reducing flexing in that portion of the spring leaf and reducing relative movement between the spring and the mounting bracket on the axle. Therefore operational stresses in that area are greatly reduced to thus improve the spring characteristics.

FIGURE 4 shows diagrammatically how eight identical spring blanks may be obtained from a single length of bar stock 10 by the use of a suitable guided cutting torch, such as torch 36 having a cutting flame 38 shown in FIGURE 5. This cutting torch may for example be the cutting equipment disclosed in United States Letters Patent No. 2,288,026 wherein a combination oxygen-propane flame is adapted to cut a clean straight planar path with essentially no loss of material at the plane of cutting but any equivalent flame cutting equipment may be employed for the purpose.

Either the cutting torch or the bar stock, or both, may be relatively moved to secure the desired pattern of flame cutting. The preferred embodiment of the invention will be described as embodying the steps of and apparatus for intermittently moving the bar stock in selected increments into a cutting station where, while the bar is stationary, two diagonal cuts are made by controlled displacement of the cutting torch. The cutting torch movement is indexed to synchronize with the movement of the bar stock, so that action is rapid and continual.

With reference to FIGURE 4, the bar stock 10 is placed on edge with one of the narrower sides such as side 19 uppermost and indexed in the apparatus, being preferably mounted in a jig of suitable design and held stationary with the leading section at the cutting station. The first planar cut 24 starts at the end edge of the bar adjacent one side of the bar and proceeds, as the torch is moved, in a straight plane diagonally toward the other side of the bar where it emerges at $E_1$.

At this point the severed end piece 11 drops off as scrap. Then the torch is shifted along the bar a short distance parallel to the length of the bar corresponding to the desired longitudinal dimension of center section 14 to a point $S_1$. The torch is now guided to traverse and cut the bar diagonally at the same angle but in a plane 26 that is inclined oppositely to that at 24, to emerge at the one side of the bar at $E_2$. Now the blank identified as No. 1 in FIGURE 4 has been severed from the bar and may be removed from the station for further processing.

Now, with the torch remaining at $E_2$ bar 10 is shifted to the left in FIGURE 4 a distance equal to the length of a leaf spring blank plus the length of a center section 14, whereby the torch is disposed at the point indicated at $S_2$. The torch then is moved to cut diagonally across the bar in plane 28 at the same angle and in the same direction as plane 24, to exit at $E_3$. This severs the blank No. 2 of FIGURE 4 from bar 10. The torch is now shifted the linear length of section 14 to point $S_3$ and then is moved diagonally across the bar to cut along plane 30 parallel to plane 26 to exit at $E_4$. This severs blank No. 3 of FIGURE 4 from bar 10.

The foregoing is repeated with each alternate diagonal planar cut being parallel to successively sever blanks Nos. 4–8 from the bar, and at the right end of FIGURE 4 the piece 29 is discarded as scrap.

A preferred method in more detail and equipment for accomplishing the foregoing will now be described.

The metal stock is suitably rolled to the size indicated in FIGURE 1, and cut smoothly to provide a bar 10 of the required length. This bar is desgassed either before or after the rolling operation and is treated to remove mill scale, as by sand blasting all surfaces, to aid in smooth sharp flame cutting during the invention.

The cleaned bar 10 is then preheated to about 700° to 800° F. to induce smooth flame cutting. This can be done by pushing the entire bar 10 through a gas furnace or through an induction heater. The induction heater preheat is best suited to the invention because it can be set to quickly heat successive leading sections of the bar as the bar is intermittently advanced into the cutting station, thus avoiding cooling off of the trailing bar sections and preventing overheating when the bar has to be reheated. Another preheat method is to provide a bar heating torch acting on the bar directly in front of the cutting torch head as by mounting both torches in a single unit, thus temporarily heating only the immediate regions to be cut while the remaining metal of the bar is relatively unaffected.

FIGURE 5 shows in enlarged detail the leading end of preheated bar 10 from which spring No. 1 is to be cut disposed immovably within the cutting station. The end edge face 21 of the bar is a smooth face at right angles to all of the side surfaces of the bar.

The cutting torch 36 is disposed to enter face 21 along a line 23 that is parallel to and spaced a predetermined small distance $d$ inwardly of bar side 13. The torch is moved linearly along the path of plane 24 cutting the steel entirely through the bar as it moves at the desired angle with respect to and toward bar side 15. When the moving torch reaches a point indicated at 25 in FIGURE 5 where it is the distance $d$ from bar side 15, the torch path is smoothly but abruptly changed to turn on a small radius 27 toward bar side 15 and then move in a straight line directly to the exit line $E_1$.

As shown best in FIGURE 5, a relatively thin flat steel shield plate 32 is held flush against the bar face 21 over the torch entrance line 23. The purpose of this is to insure that the bar surface at the starting line 23 is not pitted or gouged during initial penetration of the flame. In practice the flame first penetrates plate 32 and the inner surface of plate 32 absorbs the gouging and pitting incident to starting the cut, and then the flame enters cleanly through face 21 at line 23.

After the torch emerges at point $E_1$, the metal piece 11 now severed from bar 10 is removed. At this time tapered surface 16 corresponding to plane 24 has been formed for the blank of spring No. 1. Torch 36 is now shifted along the still stationary bar to the point $S_1$ which is bridged by a shield plate 32 similar to that at the end of the bar and for the same purpose.

The flame of torch 36 now enters the bar side at $S_1$ moves substantially at right angles to it for the distance $d$, then turns through a small arc at 31 and moves linearly along plane 26 diagonally toward bar side 13. The angle of plane 26 relative to the bar side is the same but in the opposite direction from plane 24. After reaching a point 33 located the distance $d$ from bar side 13, the torch turns through a small radius and proceeds at substantially right angles to exit at line $E_2$ on surface 13.

All of the lines of exist and entry of the torch flame with respect to the surfaces of bar 10 are parallel and perpendicular to the direction of periodic movement of the bar during the method.

As the torch exits at $E_2$, the completed blank identified as Spring No. 1 is completely severed from the bar, and part of the next succeeding blank of spring No. 2 has been formed.

The foregoing is repeated with the torch being guided into and out of the bar alternately at opposite sides, and a complete spring blank is severed from the bar with each succeeding diagonal cut.

With reference to FIGURE 3 it will be seen that the foregoing produces blanks each of which has a definite end thickness $d$ and wherein the tapered surfaces 16 and 18 merge relatively smoothly into the flat surface of central section 14 through smoothly curved transition regions indicated at 35. This prevents localization of stresses at the junctures of the tapered surfaces 16 and 18 with the central spring seat clamping region 14.

Figure 6:
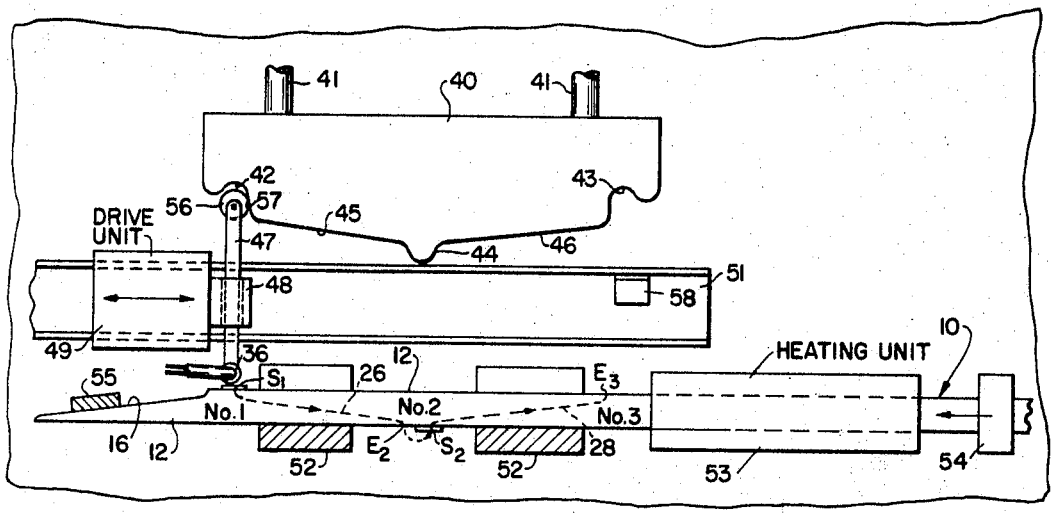
FIGURE 6 is a plan view schematically illustrating one form of flame cutting and stock handling apparatus that may be used in the invention.

FIGURE 6 is a plan view that shows more or less diagrammatically an apparatus for carrying out the invention.

A template 40 is fixedly mounted on stationary support means indicated at 41 at one side of the bar 10 in the cutting station. The side of template 40 facing the bar 10 is formed with torch guiding surfaces comprising arcuate end recesses 42 and 43, and a central round projection 44 disposed between equally oppositely inclined surfaces 45 and 46 of equal length that extend to recesses 42 and 43 respectively.

The torch 36 is mounted upon the end of a rod 47 that is slidably supported at 48 upon a reversible drive unit carriage 49 which in turn is mounted for reciprocation along a stationary track 51 disposed between the template and the bar to be cut. Torch 36 is movable with respect to unit 49 at right angles to the path of movement of bar 10, and unit 49 is movable parallel to that path.

In FIGURE 6, the parts are shown as they appear after scrap end piece 11 has been severed and torch 36 is ready to enter the bar side at $S_1$. The bar 10 has its leading end in the cutting station, resting slidably on supports 52, and it extends freely through the preheat induction heater unit 53 which is sufficiently long to heat a section of the bar corresponding to the length of the next spring blank to be cut. The trailing end of the bar is shown as passing through an intermittent feed unit 54 that is operated in timed relation to the movement of drive carriage 49 as will appear. After the scrap end 11 has been removed, an index strip 55 is placed in the cutting station to engage surface 16 of spring No. 1 to help retain the bar against movement during cutting, but it mainly serves as a stop for properly locating the bar end in the cutting station upon each intermittent advance of the bar 10.

Rod 47 carries a cam follower roller 56 at its outer end disposed in engagement with the sharply sloping face 57 of template recess 45. Rod 47 is suitably spring biased toward the template by spring means (not shown).

Carriage unit 49 is moved to the right along track 51 in FIGURE 6, which causes the torch 36 to be first rapidly advanced into the bar at line 5, and then to cut through the bar along plane 26 as follower 56 moves along template surface 45. When the follower 56 reaches the template projection 44, the torch 36 is displaced out through bar side 13 at $E_2$, moved along the length of the bar to the right for a distance equal to the length of central section 14 and then is moved to reenter the bar 10 at side 13 at the point $S_2$. By this time follower 56 has reached template surface 46 and the moving torch cuts through the bar along plane 28. When follower 56 reaches template recess 43 the torch 36 is guided out of the bar side at $E_3$, and at this point the carriage encounters a control switch indicated at 58 which arrests the carriage 49 with follower 57 disposed in recess 43.

The foregoing operation has now cut the blanks of spring No. 1 and spring No. 2 from bar 10. Now the controls of intermittent feed unit 54 are actuated, preferably automatically to longitudinally shift bar 10 to the left in FIGURE 6 until the surface 16 of the blank of spring No. 3 abuts stop 55, and the location of the leading end of the bar shown in FIGURE 6 is reestablished. The controls now act to start carriage 49 moving to the left in FIGURE 6, whereby as follower 56 moves out of recess 43 and template 40 in the reverse direction spring blanks Nos. 3 and 4 are severed from the bar 10, and then carriage is arrested in the FIGURE 6 position. The above cycle is now repeated until all spring blanks have been cut from bar 10.

It will be appreciated that the speed of movement and the cycle of drive unit 49, the frequency and speed of advance of bar 10, and interlocked controls for synchronizing these factors are all provided to insure that the bar 10 is stationary during cutting and the torch 36 is stationary and withdrawn during bar displacement. After, the first cut torch 36 severs two blanks from the bar each time it makes one traverse of the template 40.

Figure 7:
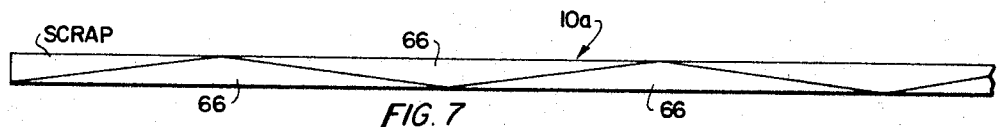
FIGURE 7 is a side elevation showing the flame cut pattern layout on bar stock for cutting tapered bars of another configuration.

FIGURE 7 illustrates a different pattern which can be cut with the equipment in FIGURE 6 by substituting a template of corresponding shape. By this, raw cut spring blanks 66 can be obtained from a bar stock 10a for further processing by drop forging, rolling, swaging, etc.

Figure 8:
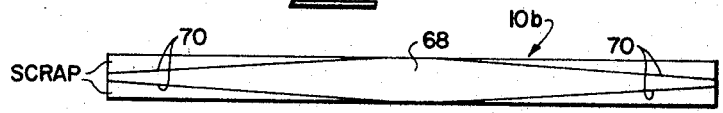
FIGURE 8 illustrates another embodiment of a spring bar flame cutting method in accord with the invention.

FIGURE 8 illustrates a pattern for a single large heavy duty spring blank 68 to be flame cut from a bar stock 10b and provided with top and bottom flame cut taper surfaces 70 cut in accordance with the invention. These flame cut spring blanks may then be further processed to provide heavy duty equalizer beams for example.

Figure 9:
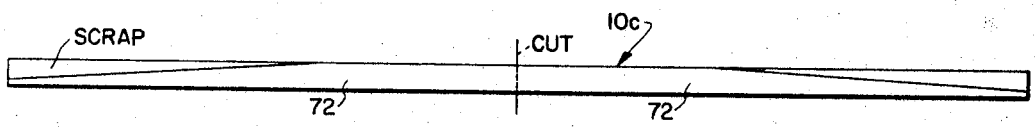
FIGURE 9 illustrates a still further embodiment of the method to produce tapered bars.
Figure 10:
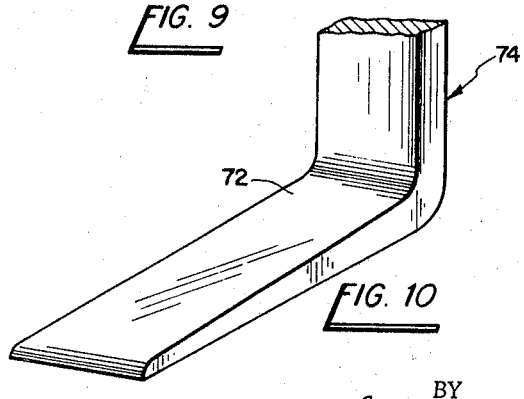
FIGURE 10 illustrates the finished product of a particular bar cut from the bar stock in FIGURE 9.

FIGURE 9 illustrates a pattern to cut tapered end bars 72 from a bar stock 10c which may be processed and bent into shape at the tapered end to form the tines 74 for a fork lift truck as illustrated in FIGURE 10. These tapered bars 72 do not need to undergo the further treatment usually required for making leaf springs according to the invention.

Referring to FIGURES 11a to 11m a complete method for producing a high qualtity tapered spring leaf is illustrated. A length of metal is rolled (FIGURE 11a) to form the rectangular cross section bar stock 10. Bar 10 is then sand or shot blasted to remove mill scale. The cleaned bar 10 is then induction preheated at 62 (FIGURE 11c) and immediately positioned for flame cutting (FIGURES 11d and e) in accord with the process described in connection with FIGURE 6.

After a spring blank 12 has been so formed, it is shot blasted on all sides (FIGURE 11f) to remove any scale produced by the flame cutting operation. Thereafter the cleaned spring blank is allowed to cool to room temperature (FIGURE 11g).

The tapered surfaces 16 and 18 of spring leaf blank 12 are now ground to a depth of about .020″ to remove surface imperfections (FIGURE 11h) such as surface cracks, non-metallic inclusions, and the like. However, for certain applications of the leaf spring blank 12 where the compressive stresses on the tapered surfaces are very low this grinding step can be omitted.

Following grinding, the spring leaf blank 12 is thereafter subjected to any further necessary surface conditioning treatment (FIGURE 11i) such as decarburization unless the preceding grinding operation has properly conditioned the surface. Then the spring blank is shaped and heat treated (FIGURE 11k) which may include such steps as heating to 1600° F., and thereafter quenching and drawing at 900° F.

Now the tension side and the adjoining side edges of spring blank 12 are shot peened (FIGURE 11l). This is followed by a "bulldozing" operation (FIGURE 11m) which consists of repeatedly loading the spring beyond its normal load deflection to produce by permanent set the specified load rate of the finished spring when the spring is at its specified load position. The foregoing sequence of steps for forming a tapered spring leaf is essentially the same as that disclosed in Patent No. 3,238,072 except for the forming of the spring blank by flame cutting instead of roll tapering.

This completes the formation of the spring leaf which is now ready for a surface protection treatment and storage for shipment.

After the grinding operation (FIGURE 11h) it may be necessary in some instances to perform additional metal working steps such as rolling, forging, upsetting, etc. to obtain a required shape of the spring which is not readily produced by flame cutting alone. However, such will not be necessary in general.

Thus the present invention provides a novel and advantageous method of producing taper leaf spring blanks or other tapered bars by flame cutting rather than by rolling or forging, which springs are especially suitable for heavy duty applications such as in road construction machinery and heavy transport vehicles to replace the more expensive and heavier hitherto conventional multi-leaf springs.

The present invention may be embodied in other forms without departing from the spirit and essential characteristic thereof, therefore, the present embodiments are to be considered in all respects as illustrative only and not restrictive, the scope of the invention being indicated by the appended claims rather than by the foregoing description.

What is claimed and desired to be secured by Letters Patent is:

1. A method of making spring leaf and like blanks having tapered ends which comprises the steps of providing a bar of suitable length of rectangular cross section metal stock and making successive diagonal cuts in smooth planes extending substantially from one side of the bar to the other, alternate cuts being oppositely inclined at the same angle.

2. The method defined in claim 1, wherein said cuts are performed by a pattern guided flame.

3. The method defined in claim 1, wherein said bar is preheated prior to said cutting.

4. A method of making spring leaf and like blanks directly from bar stock which comprises the steps of providing a bar of said stock of rectangular cross section having a predetermined length corresponding to the number of blanks to be cut therefrom and a predetermined constant width corresponding to the width of each said blank, and making successive smooth longitudinal cuts of the same length in inclined planes extending entirely across the blank from one side to the other, alternate cuts being oppositely inclined at the same angle and entering and exiting from said blank in lines disposed at the constant width side surfaces of said blank.

5. In the method defined in claim 4, the steps of holding said bar stationary with its leading end in a cutting station wherein two successive oppositely inclined cuts are made, and then shifting said bar endwise to dispose a succeeding leading end section within said cutting station.

6. In the method defined in claim 4, wherein said succeeding leading end section is preheated prior to entry into said cutting station.

7. In the method defined in claim 4, each successive cut entry line being spaced along a blank side surface a predetermined distance from the preceding cut exit line whereby each blank has an intermediate minor length portion of constant maximum width and thickness with end portions of decreasing thickness tapering therefrom.

8. The method defined in claim 4, wherein said cuts are made by a pattern guided flame.

9. A method of making spring leaf blanks which comprises the steps of providing a rolled bar of steel stock of known length corresponding to the number of blanks to be cut therefrom and having a predetermined constant width corresponding to the width of the final spring leaf and a predetermined constant thickness corresponding to the thickness of the center section of the final spring, making successive alternately oppositely inclined linear cuts at the same angle through the bar from one constant width side surface to the other, the succeeding entry and exit cut lines at each of said side surfaces being spaced a distance equal to the desired longitudinal dimension of said spring center section, whereby each blank severed from the bar has a constant width, constant thickness center section with oppositely tapered constant width ends of decreasing thickness tapering toward the ends, cleaning each severed blank to remove surface imperfections by operations including grinding, shot peening the side of the blank which is to be the tension side surface of the finished spring, and then completing the blank to finished form as a vehicle spring leaf.

10. In the method defined in claim 9, said bar being preheated in each section prior to cutting and said cutting being performed by a pattern guided torch moving through the preheated section.

11. Apparatus for cutting spring leaf and like blanks from bar stock which comprises means defining a cutting station, means for locating and holding the leading end of a bar of said stock at said station, a cutting torch at said station, carriage means mounting said torch for reciprocal movement parallel to the length of said bar, means mounting said torch on said carriage means for movement toward and from said bar, guide means at said station having torch cutting pattern defining surfaces, and cooperating follower means associated with said surfaces for moving said torch in a cutting pattern through said bar as said carriage means is moved longitudinally of said bar.

12. In the apparatus defined in claim 11, means for automatically arresting movement of said torch after predetermined travel through said cutting station, and means for subsequently advancing said bar to dispose the leading end of the bar remainder in said station.

13. In the apparatus defined in claim 11, said carriage means being reciprocably mounted on a track located between said guide means, and the bar and said follower means being means rigid with said torch biased against said surfaces.

14. In the apparatus defined in claim 11, said guide means being a template having pattern defining surfaces facing said bar arranged in oppositely inclined relation, and means maintaining said follower means in engagement with said surfaces during movement of said carriage means.

References Cited
UNITED STATES PATENTS

| | | | |
|---|---|---|---|
| 2,085,112 | 6/1937 | McKiernan | 266—23 |
| 2,288,026 | 6/1942 | Rea | 148—9 |
| 2,633,626 | 4/1953 | Danforth | 29—415 X |
| 3,238,072 | 3/1966 | Greene et al. | 29—173 |
| 3,339,908 | 9/1967 | Komarnitsky | 267—47 |
| 3,345,727 | 10/1967 | Komarnitsky | 29—173 |

THOMAS H. EAGER, *Primary Examiner.*

U.S. Cl. X.R.

29—415; 148—9; 266—23; 267—47